US012041414B1

(12) United States Patent
Roemer et al.

(10) Patent No.: US 12,041,414 B1
(45) Date of Patent: Jul. 16, 2024

(54) DIRECTIVITY PATTERN CONTROL WAVEGUIDE FOR A SPEAKER, AND SPEAKER INCLUDING A DIRECTIVITY PATTERN CONTROL WAVEGUIDE

(71) Applicant: Perlisten Audio LLC, Verona, WI (US)

(72) Inventors: Dan Roemer, Oregon, WI (US); Erik Wiederholtz, New Glarus, WI (US)

(73) Assignee: Perlisten Audio LLC, Verona, WI (US)

( * ) Notice: Subject to any disclaimer, the term of this patent is extended or adjusted under 35 U.S.C. 154(b) by 0 days.

(21) Appl. No.: 18/450,038

(22) Filed: Aug. 15, 2023

(51) Int. Cl.

| | |
|---|---|
| ***H04R 1/34*** | (2006.01) |
| ***G10K 11/32*** | (2006.01) |
| ***H04R 1/24*** | (2006.01) |
| ***H04R 1/30*** | (2006.01) |
| ***H04R 1/32*** | (2006.01) |
| ***H04R 1/40*** | (2006.01) |

(52) U.S. Cl.
CPC ............. *H04R 1/403* (2013.01); *G10K 11/32* (2013.01); *H04R 1/30* (2013.01)

(58) Field of Classification Search
CPC . H04R 1/32; H04R 1/323; H04R 1/40; H04R 1/403; H04R 1/30; H04R 1/20; H04R 1/023; H04R 1/345; H04R 1/34; H04R 1/24; G10K 11/32; G10K 11/26; G10K 11/18; G10K 11/02; G10K 11/08
See application file for complete search history.

(56) References Cited

U.S. PATENT DOCUMENTS

| | | | | | | |
|---|---|---|---|---|---|---|
| 1,884,724 | A | * | 10/1932 | Keller | H04R 1/2803 | 381/418 |
| 4,112,256 | A | * | 9/1978 | Carlsson | H04R 1/323 | 181/154 |
| 4,314,620 | A | * | 2/1982 | Gollehon | H04R 1/2819 | 181/152 |
| 4,391,346 | A | * | 7/1983 | Murakami | H04R 1/24 | 181/147 |
| 4,437,540 | A | * | 3/1984 | Murakami | H04R 1/30 | 181/150 |
| 4,524,846 | A | * | 6/1985 | Whitby | H04R 1/2865 | 181/152 |
| 4,554,414 | A | * | 11/1985 | House | H04R 23/02 | 381/186 |
| 4,565,905 | A | * | 1/1986 | Nation | H04R 9/02 | 381/186 |
| 4,580,655 | A | * | 4/1986 | Keele, Jr. | G10K 11/025 | 181/187 |
| 6,038,326 | A | * | 3/2000 | Czerwinski | H04R 1/26 | 381/342 |

(Continued)

OTHER PUBLICATIONS

U.S. Appl. No. 17/524,918, filed Nov. 12, 2021 entitled "Directivity Pattern Control Waveguide for a Speaker, and Speaker Including a Directivity Pattern Control Waveguide" (not yet published).

*Primary Examiner* — Edgardo San Martin
(74) *Attorney, Agent, or Firm* — Boardman & Clark LLP

(57) ABSTRACT

A speaker having a continuous waveguide on one side of the speaker. The speaker includes a plurality of drivers that are superimposed to project sound into the continuous waveguide. The continuous waveguide is acoustically continuous in multiple dimensions.

11 Claims, 10 Drawing Sheets

(56) References Cited

U.S. PATENT DOCUMENTS

| | | | | |
|---|---|---|---|---|
| 6,118,883 | A * | 9/2000 | Rocha | H04R 1/24 381/345 |
| 6,411,718 | B1 * | 6/2002 | Danley | H04R 1/26 381/342 |
| 6,621,909 | B1 * | 9/2003 | Webb | H04R 1/403 381/342 |
| 6,766,027 | B2 * | 7/2004 | Ryan | H04R 1/26 381/386 |
| 7,134,523 | B2 * | 11/2006 | Engebretson | H04R 1/288 381/387 |
| 7,275,621 | B1 * | 10/2007 | Delgado, Jr. | H04R 1/403 181/150 |
| 8,014,545 | B2 * | 9/2011 | Grant | H04R 1/323 381/186 |
| 8,224,001 | B1 * | 7/2012 | Waller | H04R 1/24 181/150 |
| 8,284,976 | B2 * | 10/2012 | Danley | H04R 1/30 381/337 |
| 8,515,102 | B1 * | 8/2013 | Waller | H04R 1/403 181/150 |
| 8,634,586 | B2 * | 1/2014 | Smith | H04R 1/26 381/89 |
| 8,712,091 | B2 * | 4/2014 | Taylor | H04R 1/023 381/345 |
| 9,033,098 | B2 * | 5/2015 | Bridge | H04R 1/026 181/199 |
| 9,071,908 | B2 * | 6/2015 | Vaisanen | H04R 1/345 |
| 9,894,433 | B2 * | 2/2018 | Bridge | H04R 1/345 |
| 9,955,260 | B2 | 4/2018 | Button | |
| 10,194,238 | B2 | 1/2019 | Button et al. | |
| 10,341,763 | B2 | 7/2019 | Li et al. | |
| 10,356,512 | B1 * | 7/2019 | Peace, Jr. | H04R 3/14 |
| 10,397,692 | B2 * | 8/2019 | Janes | H04R 1/26 |
| 10,440,465 | B2 * | 10/2019 | Peace, Jr. | H04R 3/04 |
| 10,531,200 | B2 | 1/2020 | Voishvillo | |
| 10,638,216 | B2 * | 4/2020 | Peace, Jr. | H04R 1/2857 |
| 10,667,036 | B2 * | 5/2020 | Kim | H04R 1/24 |
| 10,848,863 | B2 | 11/2020 | Peace, Jr. | |
| 11,240,575 | B2 * | 2/2022 | Shibakusa | H04R 1/026 |
| 11,284,194 | B2 | 3/2022 | Marti et al. | |
| 11,336,976 | B2 | 5/2022 | Subat | |
| 11,336,992 | B2 | 5/2022 | Peace et al. | |
| 11,490,194 | B1 | 11/2022 | Voishvillo et al. | |
| 11,564,032 | B2 * | 1/2023 | Garcia | H04R 1/345 |
| 2002/0106097 | A1 * | 8/2002 | Danley | H04R 1/26 381/345 |
| 2004/0125974 | A1 * | 7/2004 | Kosatos | H04R 1/323 381/335 |
| 2006/0169530 | A1 * | 8/2006 | Noselli | H04R 1/403 181/187 |
| 2011/0019862 | A1 * | 1/2011 | Smith | H04R 1/2842 381/386 |
| 2016/0073195 | A1 | 3/2016 | Adamson | |
| 2017/0325019 | A1 | 11/2017 | Bezzola | |
| 2019/0305743 | A1 | 10/2019 | Ramos | |
| 2022/0264205 | A1 | 8/2022 | Nguyen et al. | |
| 2022/0353607 | A1 | 11/2022 | Garcia et al. | |
| 2023/0199353 | A1 * | 6/2023 | Akai | H04R 7/04 381/391 |
| 2023/0317051 | A1 * | 10/2023 | Butler | G10K 13/00 367/138 |

* cited by examiner

DIRECTIVITY PATTERN CONTROL WAVEGUIDE FOR A SPEAKER, AND SPEAKER INCLUDING A DIRECTIVITY PATTERN CONTROL WAVEGUIDE

BACKGROUND

The disclosure relates to loudspeakers, and more particularly, in some implementations, the disclosure relates to speakers that may be used in a home entertainment system.

For architectural in-ceiling speakers, current technology typically provides less than desirable directivity. Most in-ceiling speakers have a poor on axis response, poor listening window, and poor power response compared to a well-designed in room loudspeaker.

A speaker or speaker system for a home entertainment system may include multiple drivers for extended bandwidth. For example, U.S. Pat. No. 11,564,032 to Harman International Industries discloses speakers having two or three drivers. The Harman solution attempts to address the issues with in-ceiling speakers by using multiple drivers and directing the drivers as shown in FIG. 7 of U.S. Pat. No. 11,564,032. However, the directing of the drivers as shown, utilizing the designed horn, and the inclusion of the window in the waveguide body still creates a less than desired on axis response, listening window, and power response. Accordingly, a need exists for a different alternative.

SUMMARY

In embodiments, the disclosure provides a speaker having a continuous waveguide on one side of the speaker. The speaker includes a plurality of drivers (or transducers) that are superimposed to project sound into the continuous waveguide. The continuous waveguide is effectively continuous in multiple dimensions.

In embodiments, the disclosure alternatively or additionally provides a waveguide having a cover or grill that is part of the waveguide. The cover is for one of the plurality of drivers and has a low acoustic impedance for the one driver. The cover appears to have a high acoustic impedance for another driver of the plurality of drivers. The cover can further provide, at least in part, acoustic filtering designed to the bandwidth needs for the one driver.

In embodiments, the disclosure alternatively or additionally provides a speaker having a waveguide with a mouth in a placement plane with a placement axis orthogonal to the placement plane. The speaker includes a plurality of drivers. One of the plurality of drivers projects sound into the throat of the waveguide and the resultant sound has a major axis of propagation different from the placement axis orthogonal to the placement plane. Another of the plurality of drivers projects sound into the waveguide and the resultant sound has a major axis of propagation substantially in the placement axis orthogonal to the placement plane.

In embodiments, the disclosure alternatively or additionally provides a waveguide having a cover or grill that is part of the waveguide. The speaker includes a driver recessed from the cover by a wall. The cover, the wall, and the driver can define a cavity. The cover and the cavity can provide a filter (e.g., a lowpass filter) for the driver.

In embodiments, the disclosure alternatively or additionally provides a waveguide that controls directivity of sound in at least two dimensions and adds drivers for additional power handling and to manipulate the sound resulting from the speaker.

In embodiments, the disclosure alternatively or additionally provides a waveguide with a multi-driver array. For example, the multi-driver array can include a two or three driver array. The waveguide can be used to help design the multiple axis directivities using the physical shape for the waveguide and through the physical placement of the drivers.

In one embodiment, the disclosure provides a directivity pattern control (DPC) waveguide for a speaker and a speaker including the DPC waveguide. The DPC waveguide defines a first axis, a second axis orthogonal to the first axis, and a third axis orthogonal to the second axis and orthogonal to the first axis. The DPC waveguide includes a waveguide body having a body surface. The waveguide body includes a first driver aperture formed by the waveguide body, and a second driver aperture formed by the waveguide body. The DPC waveguide further includes a first driver coupled to the waveguide body and to propagate sound toward the first driver aperture, a second driver coupled to the waveguide body and substantially adjacent to the second driver aperture and to propagate sound toward the second driver aperture, and a driver cover coupled to the waveguide body and to receive sound from the first driver. The driver cover has an exterior surface. The body surface and the exterior surface are contiguous and furthers an acoustically continuous waveguide surface on a side of the DPC waveguide for the second driver.

Further understanding of one or more aspects of the invention can be understood by the specification herein.

BRIEF DESCRIPTION OF DRAWINGS

Various examples of embodiments of the systems, devices, and methods according to this invention will be described in detail, with reference to the following figures.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

Within the scope of this application, it is expressly intended that the various aspects, embodiments, examples, and alternatives set out in the preceding paragraphs, the following description, the claims, and/or the drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

DETAILED DESCRIPTION

Figure 1:
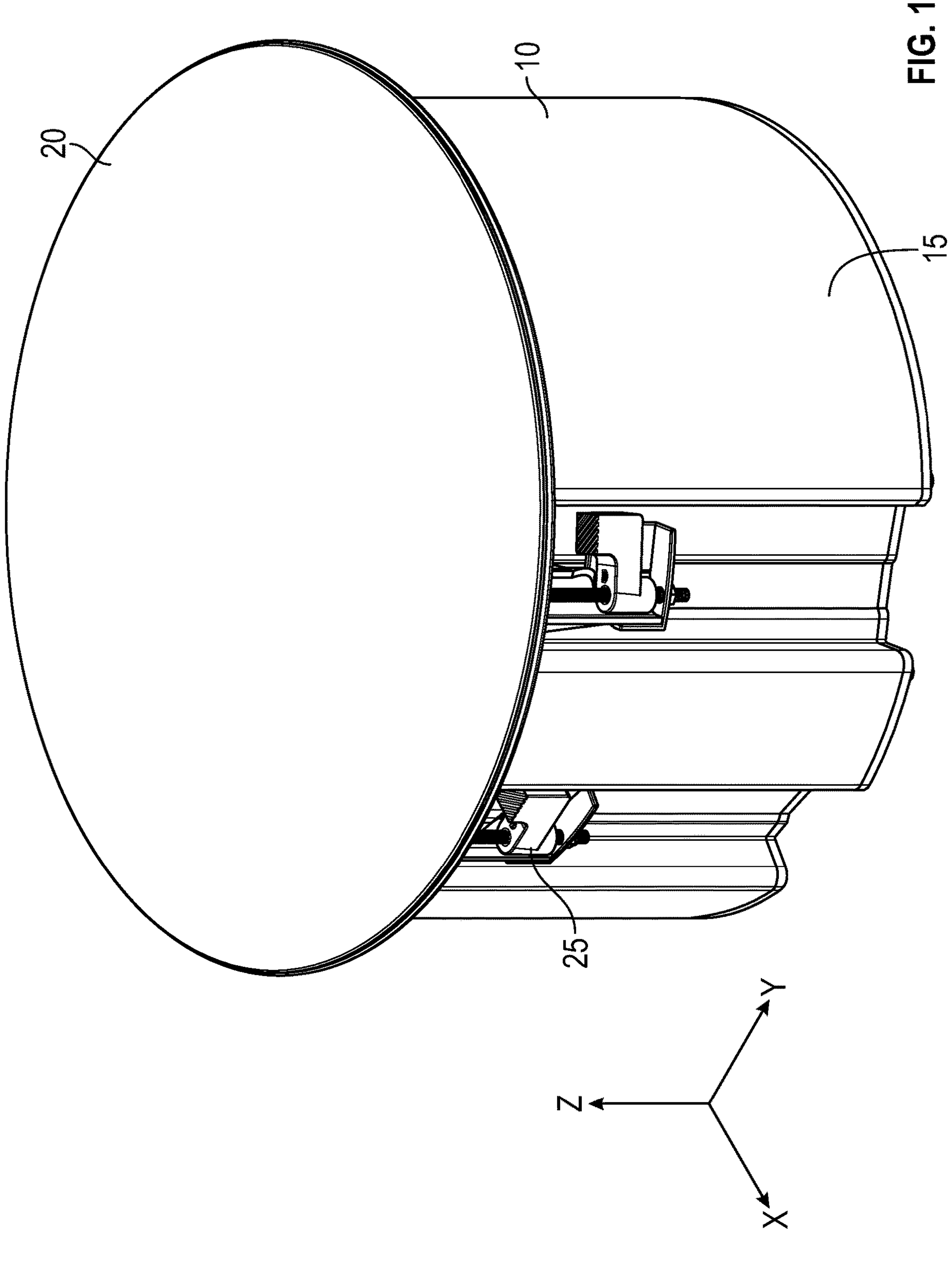
FIG. 1 is a perspective view of a speaker.
Figure 2:
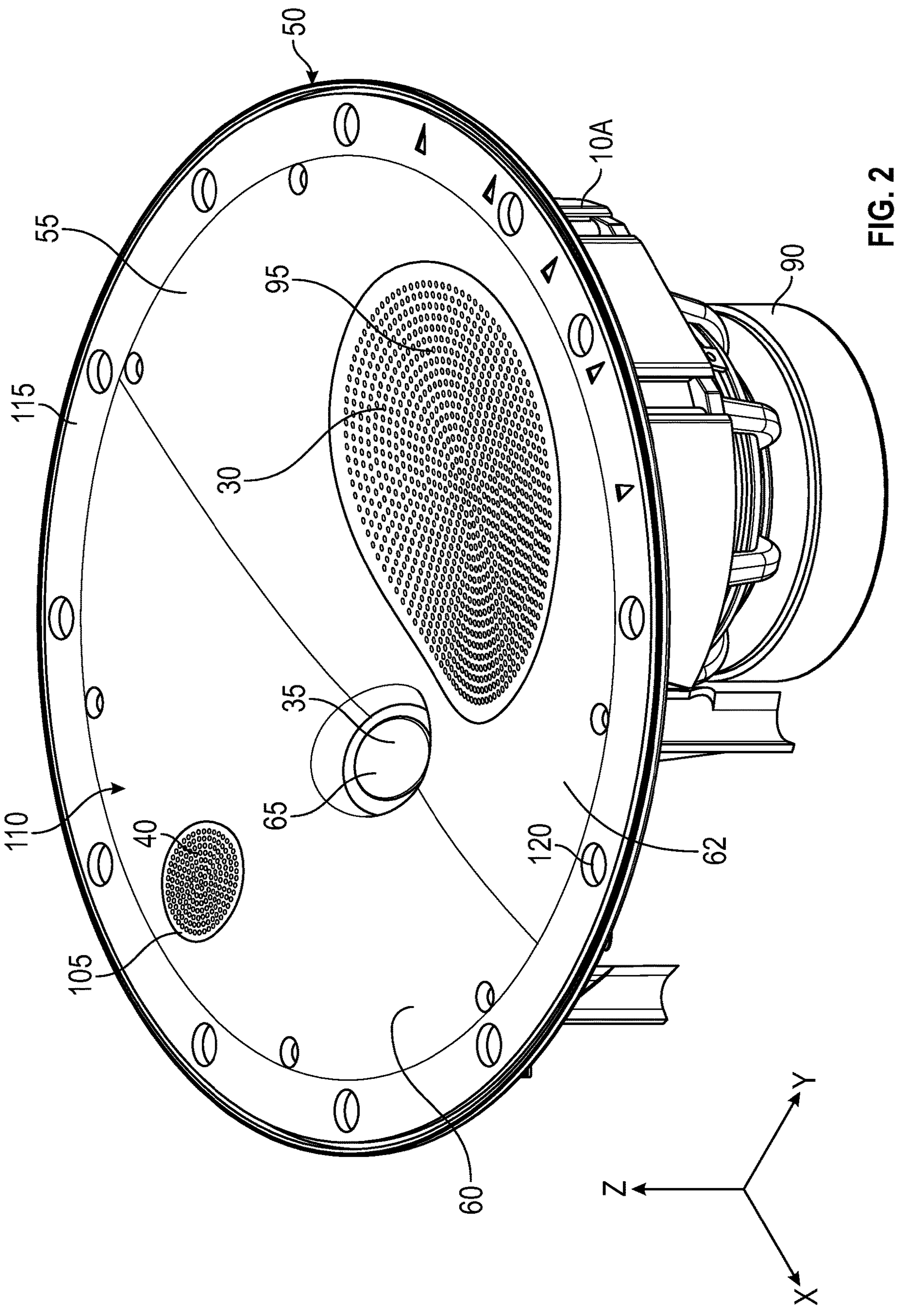
FIG. 2 is a perspective view of the speaker of FIG. 1 with the cover and the can housing removed.
Figure 3:
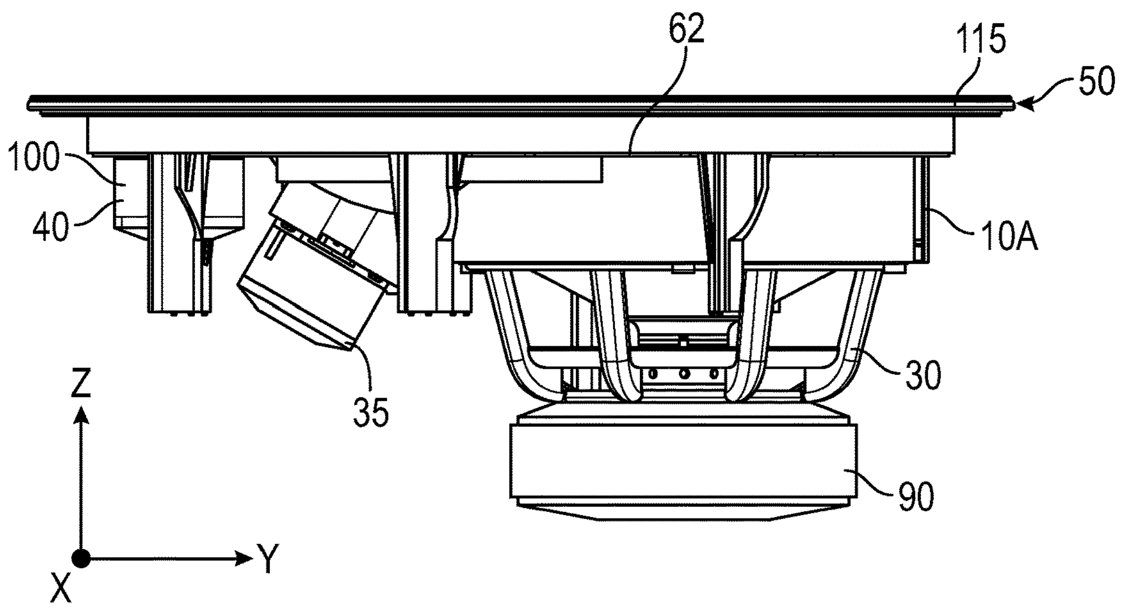
FIG. 3 is a side view of the speaker of FIG. 2.

A loudspeaker (also simply referred to as a "speaker") 10 is shown in FIG. 1. The speaker 10 includes a housing (also referred to as an "enclosure" or "chassis" or "can") 15, a cover (also referred to as a "grill") 20, and mounting apparatuses (one mounting 25 apparatus is labelled). The shown speaker 10 is an in-ceiling speaker. However, it is envisioned that aspects of the invention can be used in other speaker types.

FIGS. 2-7 show additional views of the speaker (being represented as speaker 10A) with the housing 15 and the cover 20 removed. The speaker 10A includes a plurality of drivers or transducers for creating soundwaves in response to electrical signals. Three drivers 30, 35, and 40 are shown in the speaker 10A. The number and types of drivers (e.g., subwoofers, woofers, mid-woofers, mid-tweeters, tweeters, etc.) in the speaker 10 can vary.

Also included in the housing 15 is circuitry, which includes a speaker crossover circuit (also referred to as the "speaker crossover" or simply "crossover"). The speaker crossover receives an audio signal and divides or filters the audio signal according to one or more predefined thresholds. The speaker crossover supplies each driver with the signal range it was designed to best reproduce. For example, the speaker crossover ensures that each driver (e.g., driver 30, 35, or 40) receives the frequencies it was designed to best reproduce. The speaker crossover can further delineate the output signals with varying amplitudes and phases. The speaker crossover may be implemented via hardware, software (stored in memory and executed by a processor), or a combination of hardware and software, and may be referred to as passive or active. For the speaker 10A shown, the speaker crossover is implemented by hardware and is a passive crossover.

The speaker 10A further includes what is referred to herein as a directivity pattern control (DPC) waveguide 50. The DPC waveguide 50 combines the technology of a waveguide (or baffle) 55 with multiple drivers 30, 35, and/or 40 for a beamforming array. Two of the drivers 30 and 40 have a driver cover (discussed further below) that are substantially flush with the front surface 60 of a waveguide body 62. The second driver 35 is at a throat (or entrance) 65 of the waveguide 55. For the construction shown, the second driver 35 includes a wide frequency (or wide bandwidth or wide range) tweeter. An example frequency range for the wide-range tweeter is 1 kHZ to 20 kHz. For the construction shown, the first driver 30 includes a woofer. An example frequency of the woofer is less than 1500 Hz. For the construction shown, the third driver 40 includes a mid-range tweeter. An example frequency range for the mid-range tweeter is 1 kHZ to 5 kHz. The example frequencies are just that—examples—and are meant to provide context. Other frequencies and types of drivers are envisioned for the drivers 30, 35, and/or 40.

The size of the drivers (or transducers) 35 and 40 can vary and range from, for example, a diameter of 13 mm to 50 mm, with a more defined range of 22 mm to 32 mm, with example diameters including 26 mm and 28 mm. In the construction shown, the drivers 35 and 40 have the same diameter, although it is envisioned that the diameters of the drivers 35 and 40 can vary. The size of the driver (or transducer) 30 can vary and range from, for example, a diameter of 130 mm to 200 mm, with a more defined range of 145 mm to 180 mm, with an example diameter of 165 mm. Also in the shown construction, the three drivers 30, 35, and 40 are in a linear array and are part of a standalone speaker 10A. However, other arrays are envisioned, and it is also envisioned that the DPC waveguide 50 can act as a transducer to be used with other drivers in a housing as part of a speaker.

Figure 8:
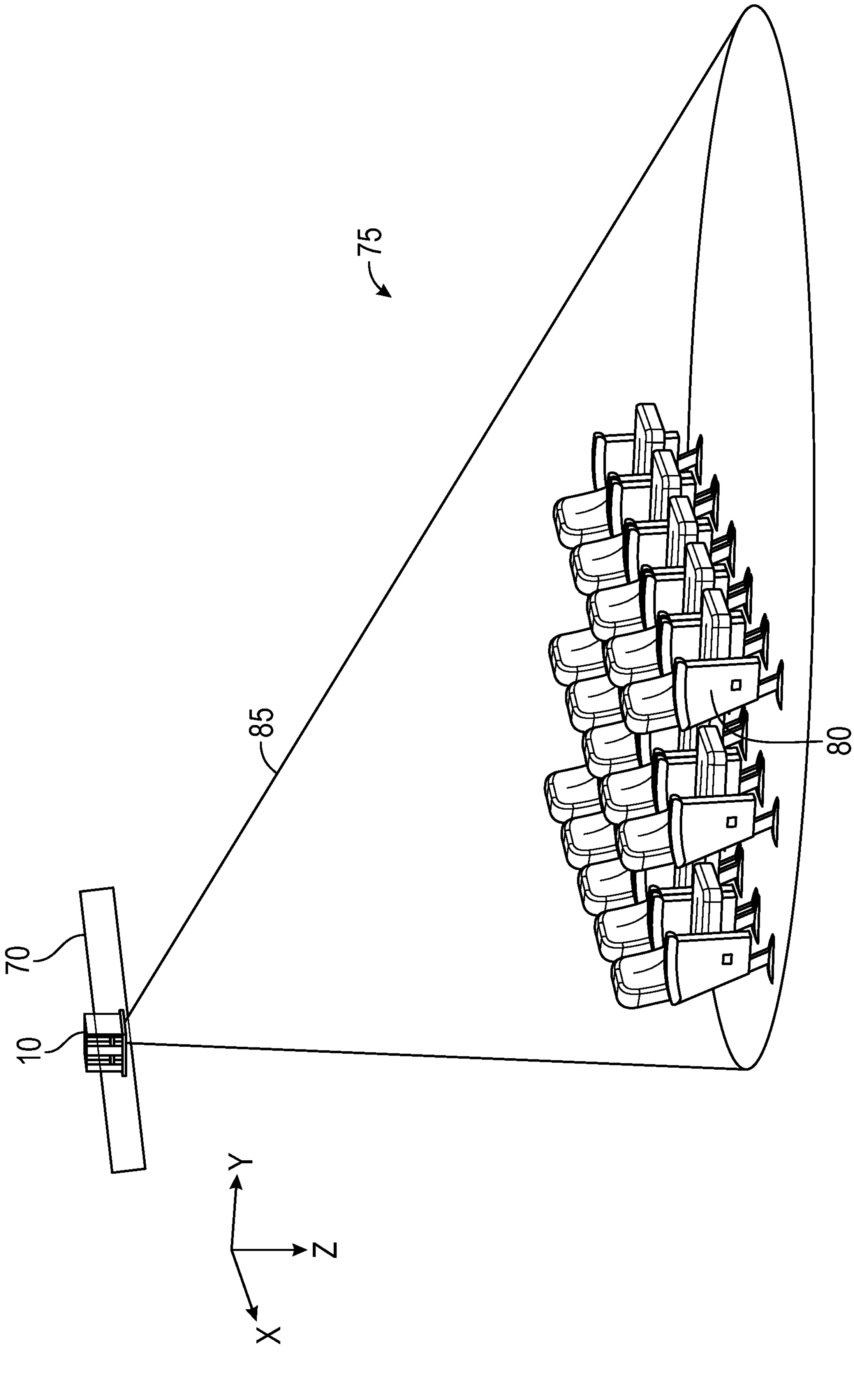
FIG. 8 is a virtual representation of a directed sound area coverage of a driver of the speaker of FIG. 1 in a home theatre room.
Figure 9:
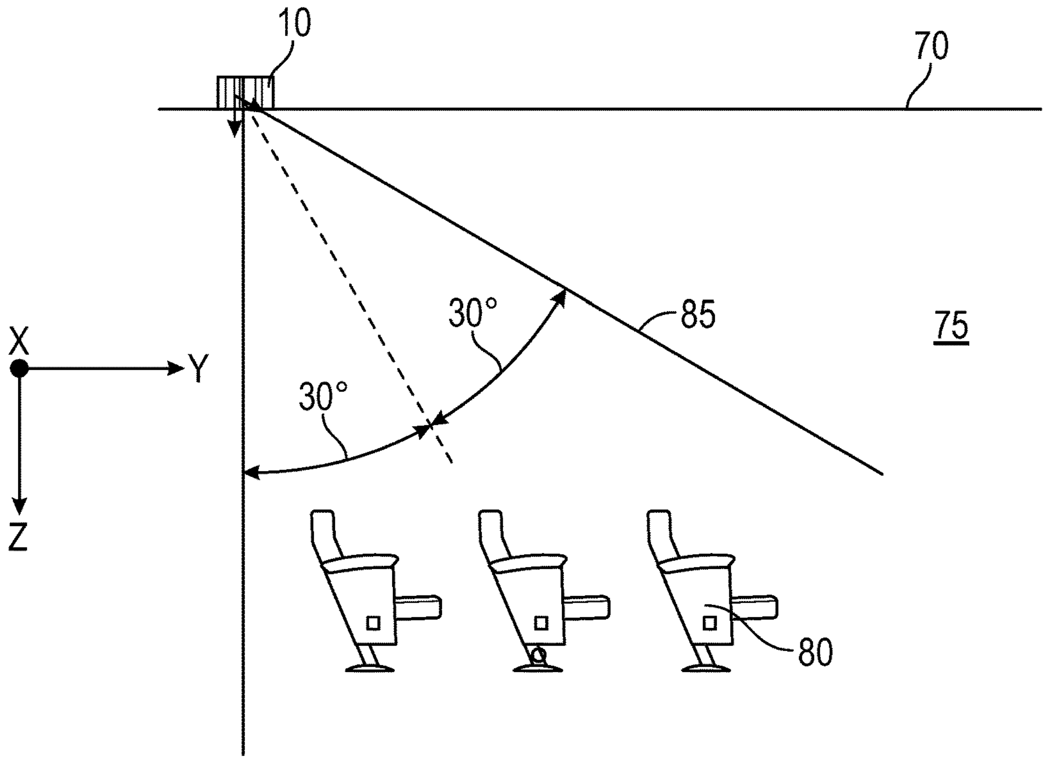
FIG. 9 is a virtual representation of the speaker and room of FIG. 8 in a first sectional view.
Figure 10:
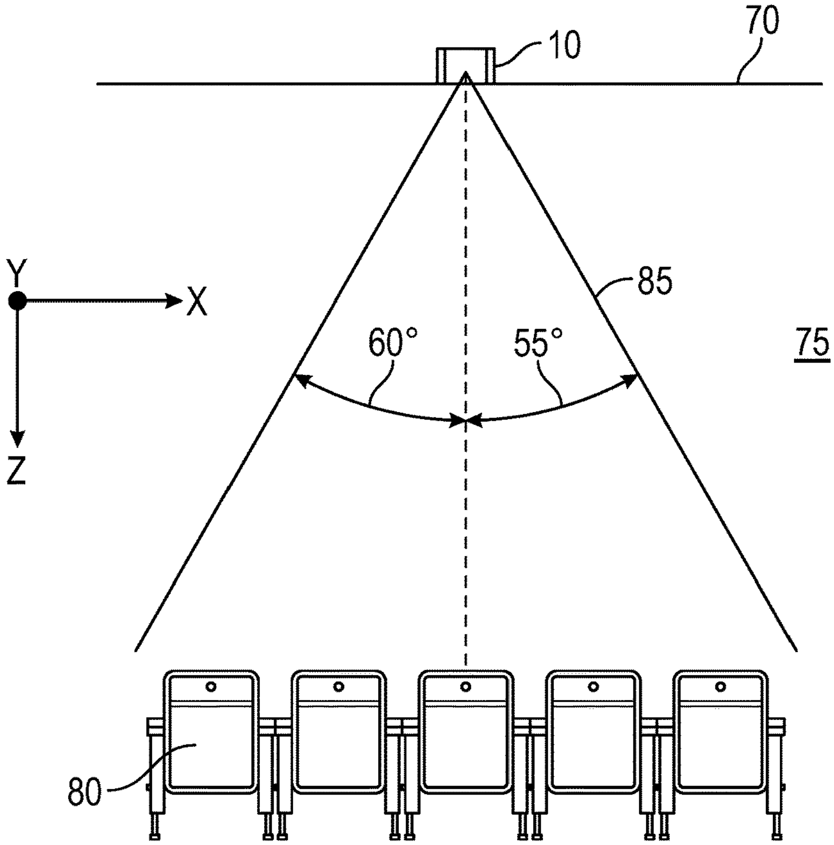
FIG. 10 is a virtual representation of the speaker and room of FIG. 8 in a second sectional view.

Referring to FIGS. 8-10, the speaker 10A can be placed in a ceiling 70 of a room 75. An example room 75 is a home theatre room of a residence. The shown room includes seats (one seat 80 is labelled). The speaker has a first axis of propagation (identified as the z-axis), a second axis of propagation (identified as the y-axis) orthogonal to the z-axis, and a third axis of propagation (identified as the x-axis) orthogonal to the z-axis and the y-axis. The z-axis can be referred to as the primary axis of propagation, with the y-axis and the x-axis referred to as the secondary axes of propagation.

FIGS. 8-10 show a representation 85 of the propagation of sound from the second driver 35 through the waveguide 55. The representation 85 is a cone (or partial lobe) from the speaker 10. The creation of the representation 85 (i.e., the propagation of sound) will be discussed in more detail below. However, a person skilled in the art would understand that the actual sound propagation from the driver 35 and waveguide 55 would be more complex than the representation 85 shown. Also as discussed further below, the propagation of sound from the first driver 30 and the third driver 40 are omnidirectional. The resultant of the DPC waveguide 50 is a complex sound pattern directed at the target axis (for example, 30 degrees) to have an even response for more people in a listening area.

Referring back to FIGS. 2-7, the figures show various views of the DPC waveguide 50. The DPC waveguide 50 includes the waveguide body 62, the center driver (or tweeter or transducer) 35, and the side drivers 30 and 40. The side driver 30 includes a woofer 90 and a cover (or grill) 95. The side driver 40 includes a tweeter 100 and a cover (or grill) 105. The construction shown for the waveguide 55 is a discoid body or disk. However, other shapes for the waveguide 55 are envisioned. As will be discussed below, the waveguide front surface 60 of the waveguide 55 is acoustically perceived from the center driver 35 as a continuous waveguide. That is, the sound propagating from the center driver 35 to the throat 65 through the waveguide 55 through the mouth 110 has no substantial acoustic discontinuities. The center driver 35 includes a tweeter.

The waveguide body 62 includes a rim portion 115 that defines a plurality of fastening apertures (aperture 120 is labelled) to receive fasteners (e.g., screws) to couple the DPC waveguide 50 to the housing 15.

Figure 6:
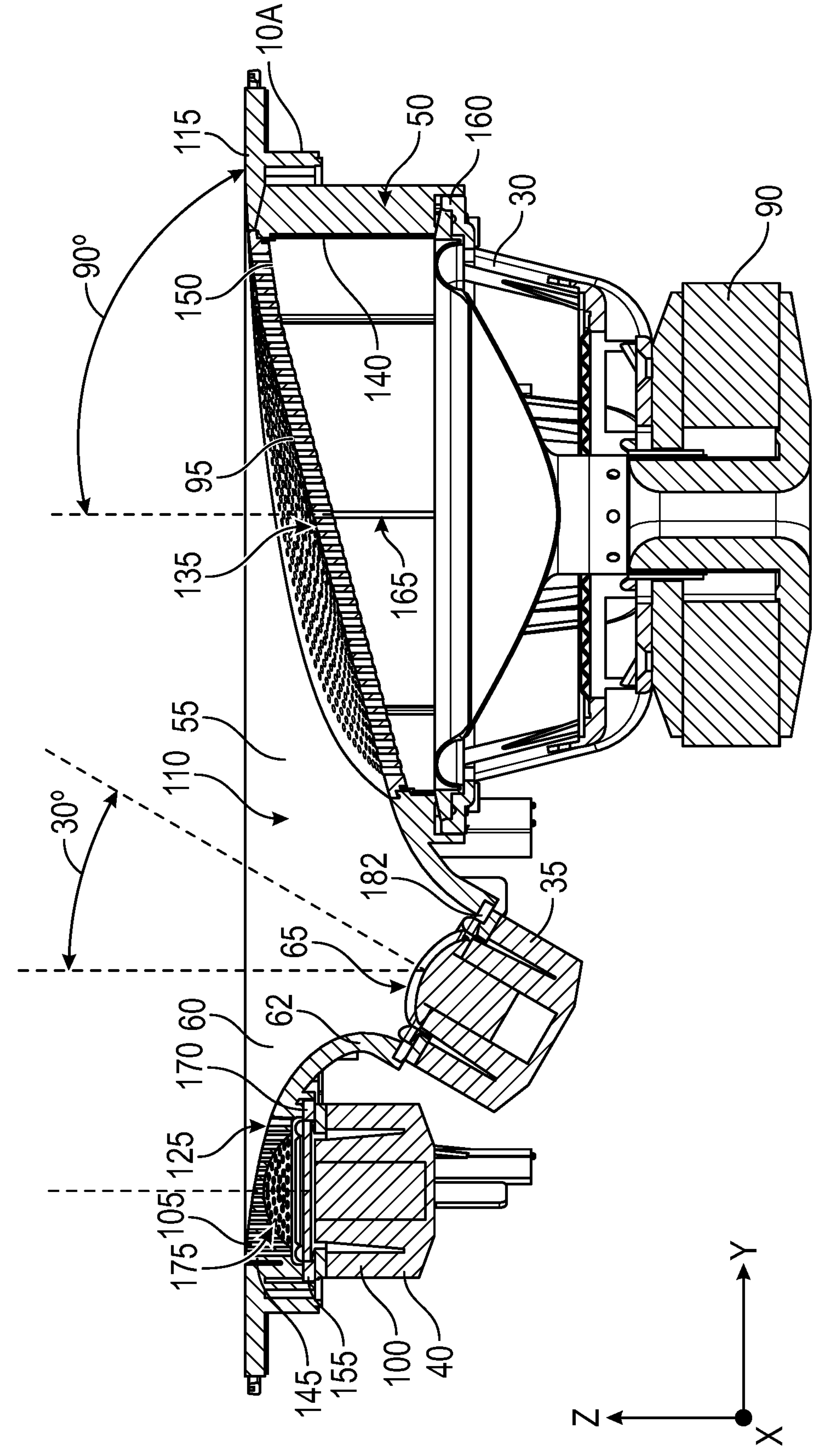
FIG. 6 is a first section view of the speaker of FIG. 2

The waveguide body 62 further includes or defines three driver apertures 125, 65, and 135 (best seen in FIG. 6). The exterior driver apertures 125 and 135 include aperture walls 140 and 145, respectively. The aperture walls 140 and 145 include shelves 150 and 155, respectively. The shelf 150 receives the cover 95 covering the woofer 90. The shelf 155 receives the second cover (or grill) 105 covering the tweeter 100. The aperture wall 140 further includes a shelf 160 to receive the woofer 90. The aperture wall 140 with the placement of the cover 95 and the woofer 90 defines a cavity (or volume) 165 for sound propagation from the woofer 90 to the cover 95. The aperture wall 145 further includes a shelf 170 to receive the tweeter 100. The aperture wall 145 with the placement of the cover 105 and the tweeter 100 defines a cavity (or volume) 175 for sound propagation from the tweeter 100 to the cover 105. The distance of propagation from the woofer 90 to the cover 95 is greater than the distance of propagation from the tweeter 100 to the cover 105, which is discussed further below as part of acoustic filtering. The waveguide body 62 includes a shelf 182 to receive the tweeter (or driver or transducer) 35.

In the shown construction, the waveguide body 62 is a substantially rigid body that can be made of plastic, wood, metal (e.g., steel, aluminum), or similar materials. The cover 95 and the cover 105 are preferably the same material as the waveguide body 62. However, it is envisioned that the cover 95 and the cover 105 can be made of a different material. For the construction shown, the waveguide body 62, the cover 95, and the cover 105 are made of a poly or plastic material. The cover 95, cover 105, woofer 90, tweeter 100, and tweeter 35 are connected and fixed to the waveguide body 62 by one or more of glue, screws, ribs, frictions, and snap fits. However, it is envisioned other fasteners are possible to the ones just listed.

Figure 11:
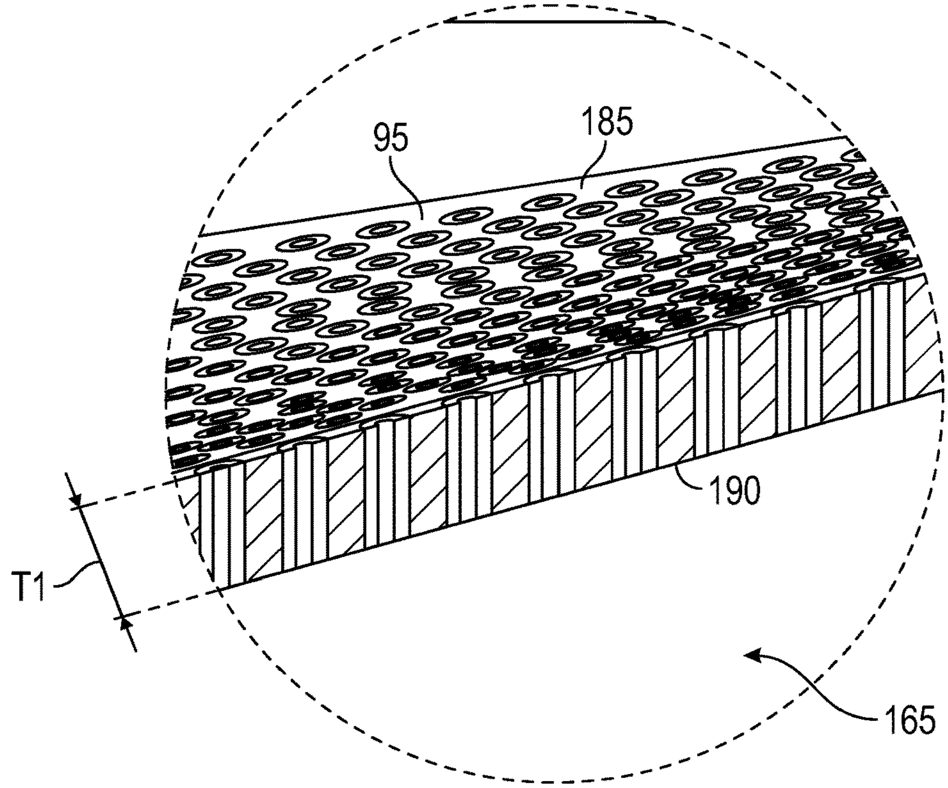
FIG. 11 is an enlarged view of a portion of the speaker of FIG. 6.

An enlarged view of a portion of the cover 95 is shown in FIG. 11. The cover 95 has a thickness T1 from an exterior surface 185 to an interior surface 190. Included within the cover 95 from the exterior surface 185 to the interior surface 190 are a plurality of perforations (or apertures or holes). One perforation 195 is labelled in FIG. 11. The plurality of perforations 195 is shown as circular, but it is envisioned that other cross-sectional shapes are possible. The exterior surface 185 of the cover 95 is contoured to match the contour of the surface 60 of the waveguide body 62. Further discussion regarding the cover 95 will be provided below.

Figure 12:
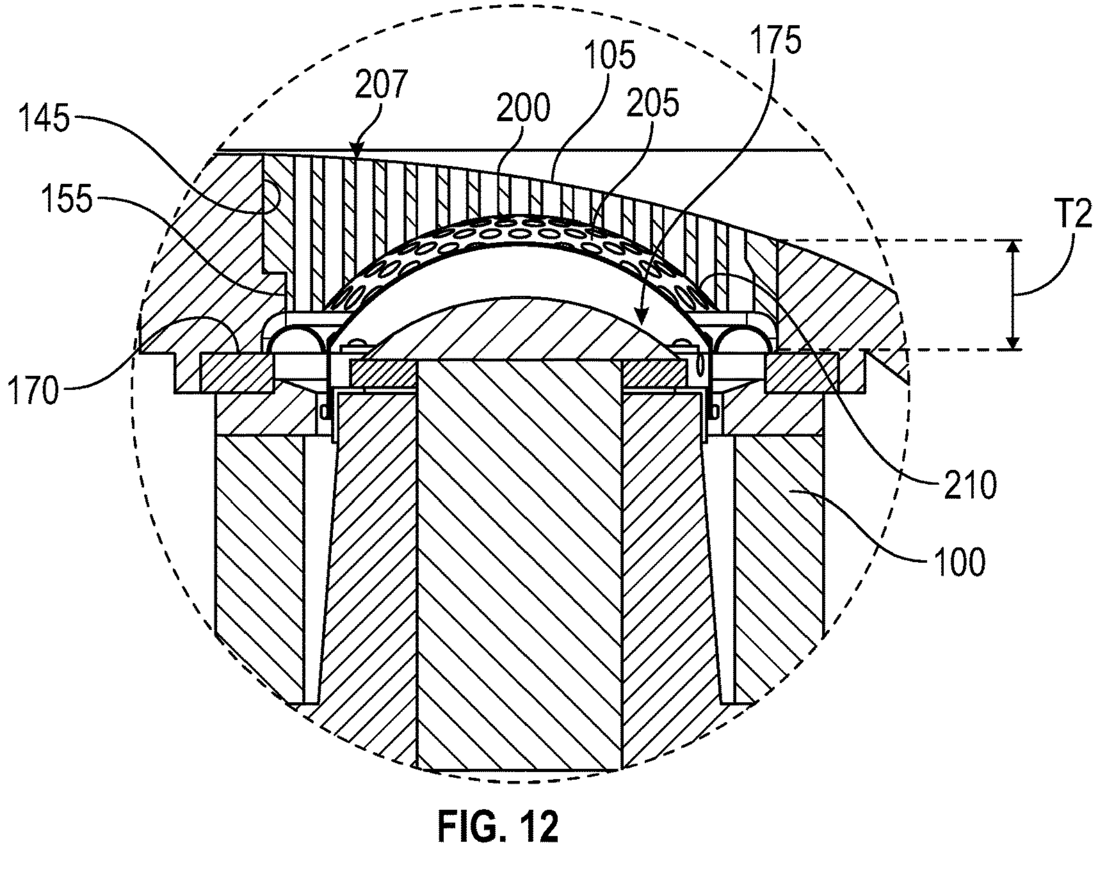
FIG. 12 is an enlarged view of a second portion of the speaker of FIG. 6

An enlarged view of the cover 105 is shown in FIG. 12. The cover 105 has a variable thickness T2 from an exterior surface 200 to an interior surface 205. Included within the cover 105 from the exterior surface 200 to the interior surface 205 are a plurality of perforations (or apertures or holes). One perforation 207 is labelled in FIG. 12. The plurality of perforations is shown as circular, but it is envisioned that other cross-sectional shapes are possible. The exterior surface 200 of the cover 105 is contoured to match the contour of the surface 60 of the waveguide body 62. The waveguide body 62, the cover 95, and the cover 105 form the waveguide 55. Further discussion regarding the cover 105 will be provided below.

Figure 4:
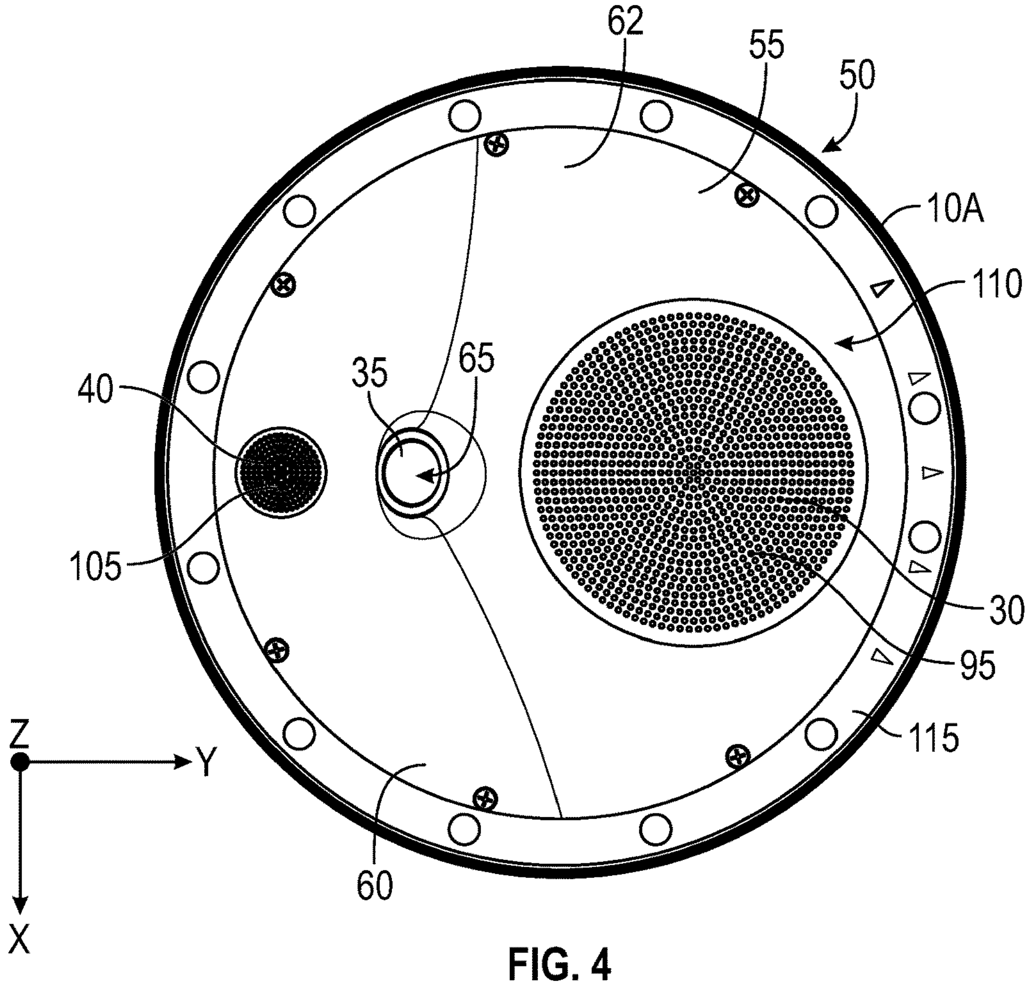
FIG. 4 is a front view of the speaker of FIG. 2.
Figure 5:
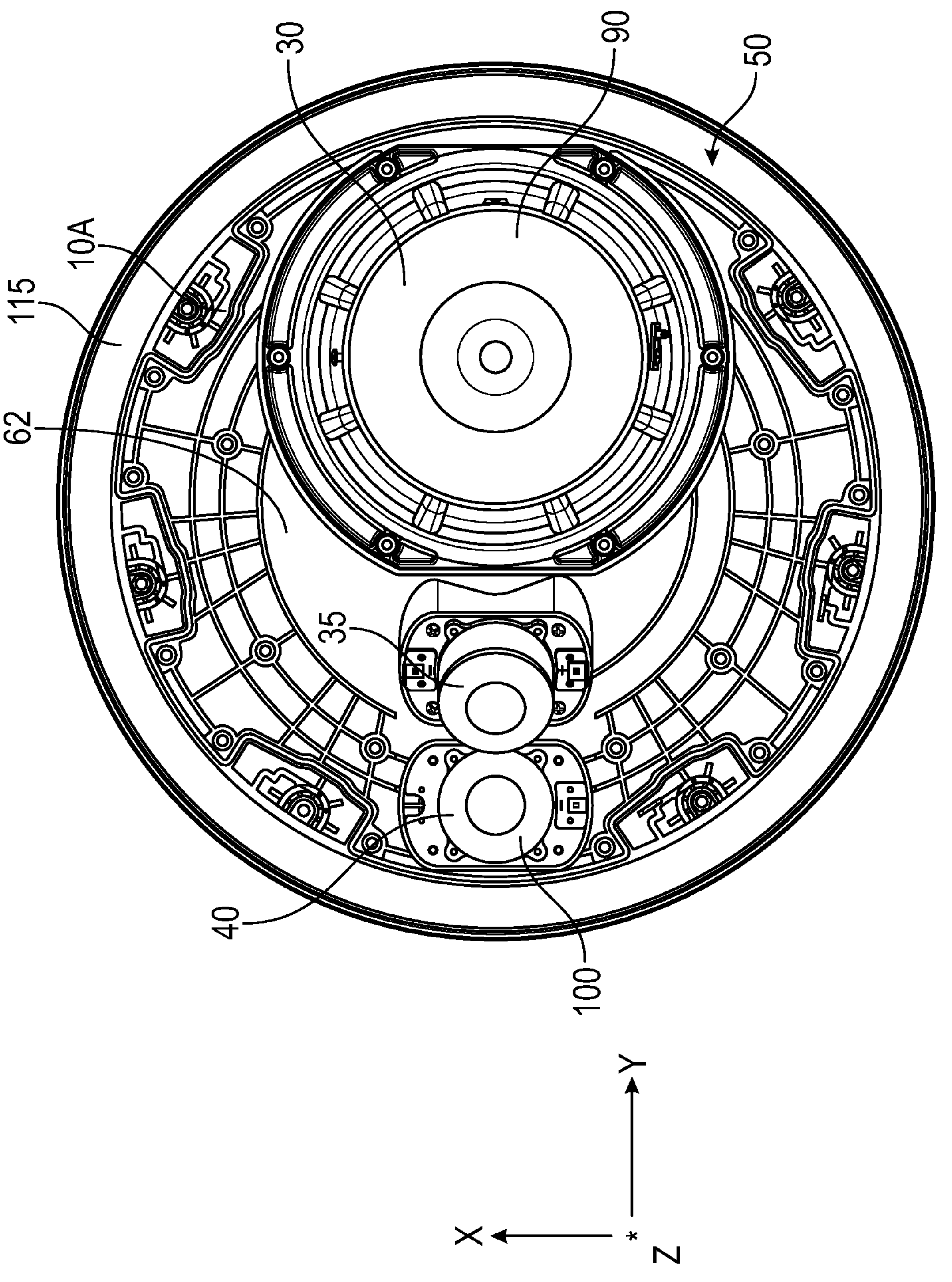
FIG. 5 is a rear view of the speaker of FIG. 2.

The speaker 10 has a natural placement within a body. For example, the speaker 10 in FIGS. 8-10 is placed within a ceiling 70 of a room 75. The opening for sound propagation from the speaker 10 is directed towards the room 75. That opening, which coincides with the mouth end of the waveguide 55, is substantially parallel to the ceiling 70 and can be viewed as being in the x-y plane created by the x-axis and the y-axis. This is referred to herein as the placement plane. From this vantage point, the placement axis for the speaker 10A is defined orthogonal to the x-y plane, i.e., along the z-axis. The speaker 10/10A can include indicia (triangles are shown in FIG. 4) to help a user locate an on-axis response and listening window for the speaker 10/10A. While triangles are shown, other indicia are possible.

Referring now to FIG. 6, the major axis of sound propagation from the woofer 90 through the cavity 165 through the cover 95 is in the z-axis (i.e., the placement axis) as viewed in the drawings. Similarly, the major axis of sound proportion from tweeter 100 through the cavity 180 through the cover 105 is also in the z-axis (i.e., the placement axis) as viewed in the drawings. As will be discussed below, the major axis of sound propagation from the tweeter 35 through the waveguide body 62 is not along the z-axis; i.e., at an axis different from the placement axis.

Referring back to FIG. 11, the cover 95 has a thickness T1, which is substantially uniform throughout the cover 95. While the cover 95 has a plurality of discontinuities along the surface 60 of the waveguide 55, the discontinuities (i.e., the perforations 195) are mostly or substantially orthogonal to the surface 60. Through acoustic design, a designer can define the frequency of the tweeter 65, the number of discontinues, and the thickness T1 of the cover 95 to allow the cover 95 to appear solid (i.e., a high acoustic impedance) from the standpoint of the tweeter 65 along the surface 60. That is sound propagating from the tweeter 65 substantially acts as the waveguide 55 is uninterrupted or solid.

Conversely, the perforations 195 are parallel to the major axis of propagation from woofer 90 which creates a low acoustic impedance from the standpoint of the woofer 90. Moreover, through acoustic design, a designer can define the number of discontinues 195, the thickness T1 of the cover 95 and the amount of volume of the cavity 165 (e.g., through the use of the lengthening of the aperture wall 140) to create a lowpass filter at a desired cutoff frequency and a desired quality factor. The lowpass filter can provide better control of the bandwidth and can aid in passive filter design for the speaker 10A than the woofer 90 alone.

Referring now to FIG. 12, the cover 105 has a variable thickness T2 throughout the cover 105. The variable thickness T2 allows the tweeter 100 to sit consistently close to the interior wall 205 of the cover 105. That is the interior wall 205 is a spherical dome to match the spherical dome 210 of the tweeter 100. This allows the cavity 180 to be substantially small or nonexistent, particularly as compared to the cavity 165. Similar to the cover 95, the cover 105 has a plurality of discontinuities (i.e., the perforations 207) along the surface 60 of the waveguide 55. The discontinuities (or apertures or perforations) are mostly or substantially orthogonal to the waveguide surface 60. Through acoustic design, a designer can define the frequency bandwidth of the tweeter 35, the number of discontinues 207, and the variable thickness T2 of the cover 105 to allow the cover 105 to act solid (i.e., a high acoustic impedance) from the standpoint of the tweeter 35 along the surface 60. That is sound propagating from the tweeter 35 substantially acts as the waveguide 55 is uninterrupted or solid.

Conversely, the apertures or perforations are parallel to the major axis of propagation from tweeter 100 which creates a low acoustic impedance for the tweeter 100. Moreover, through acoustic design, a designer can define the number of discontinues 207, the variable thickness T2 of the cover 105 and the amount of volume of the cavity 180 to create a desired filter and a desired quality factor for the tweeter 100. It should also be noted that the sound projected from the cover 95 and the cover 105 is substantially omnidirectional along the z-axis.

The waveguide 55 has a contoured or horn shape. The orientation of the waveguide 55 and the horn shape of the waveguide 55 help with the directivity/dispersion of the soundwave propagating from the tweeter 35. Shown in the construction of the drawings, the waveguide 55 includes a horn (or contoured) surface 60. As already discussed, the covers 95 and 105 have an exterior wall 185 and 200, respectively, that is shaped to align with the surface 60. The waveguide 55 is designed to control directivity to best meet the goals of the speaker 10A.

In one implementation and as shown with FIG. 9, the waveguide 55 is designed to have the major axis of sound propagation to be offset of the z-axis in the y-z plane. In the shown example, the major axis of propagation is 30 degrees offset from the z-axis in the x-y plane; however, other offset angles are envisioned. The listening window is +/− approximately 30 degrees off of the major axis of propagation through the design of the waveguide body (or horn) 62. Again, the design of the waveguide body can provide a different listening window than +/−30 degrees.

Continuing with FIG. 10, the waveguide 55 is designed to have the major axis of sound propagation to be substantially near the z-axis in the x-z plane. In the shown example, the major axis of propagation is zero degrees offset from the z-axis in the x-z plane; however, other offsets are envisioned. The listening window is +/− substantially 55-60 degrees off of the major axis of propagation. The result of the design of the waveguide 55 is the cone 85 of FIG. 8.

Before proceeding further and as stated, the given degree values for the major axes of propagation and the listening windows are example values. Other values are possible. One skill in the art will note that FIG. 10 shows an asymmetry in the listening window in the x-plane. That is the one edge of the cone representation is 55 degrees and the other edge of the cone representation is 60 degrees. This results in the listening window not being truly symmetrical and the major axis of sound propagation. The creation of an asymmetry allows a diffraction on the edge of the DPC waveguide 50 to be reduced as compared to a completely symmetrical waveguide. Lastly, one skilled in the art will understand that FIGS. 9 and 10 represent a listening window two-dimensionally. The actual listening window, as stated above, is a cone or lobe shape and is three-dimensional in shape, which is generally represented in FIG. 8.

Figure 7:
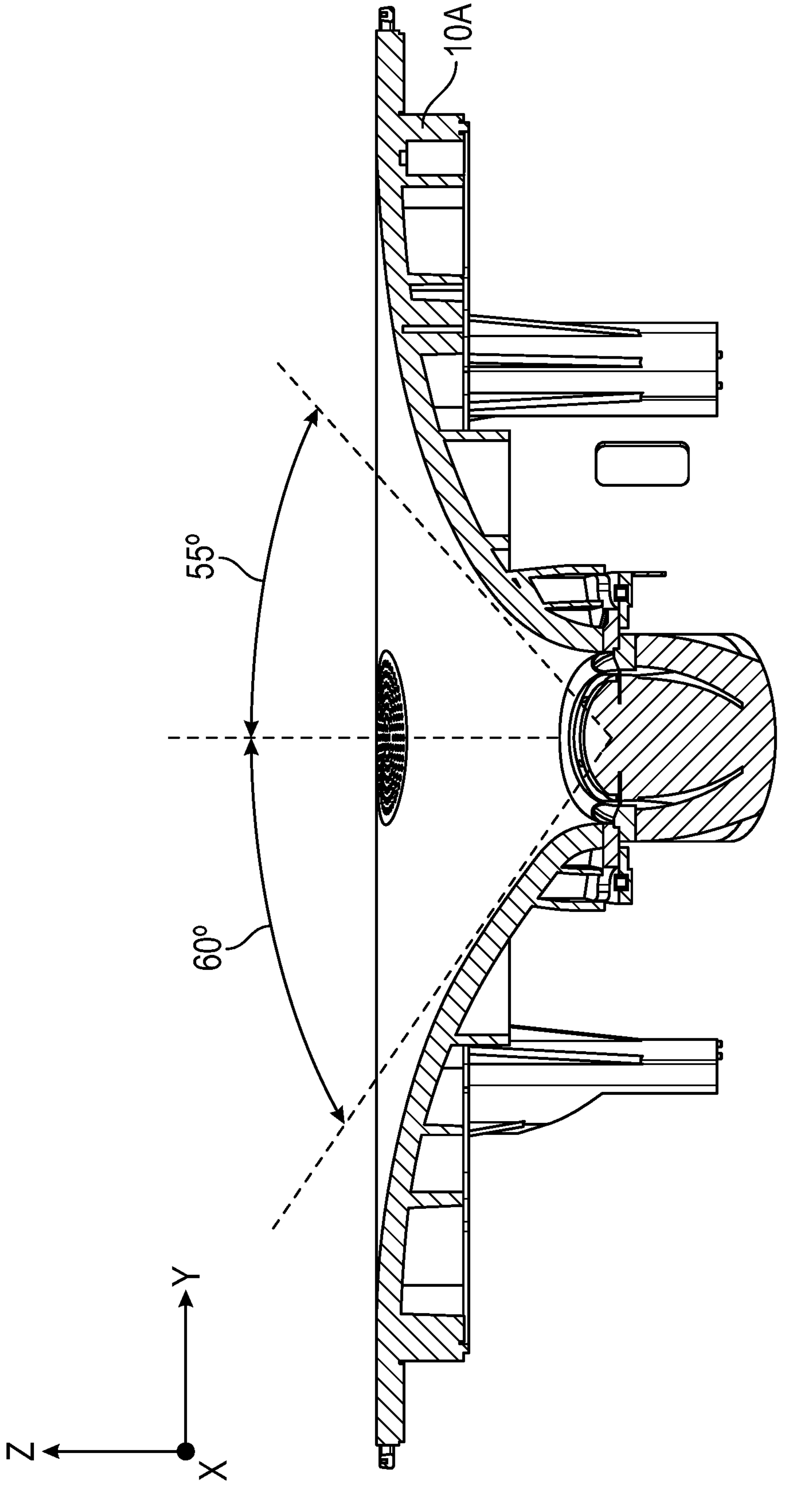
FIG. 7 is a second section view of the speaker of FIG. 2.

FIG. 6 shows the waveguide 55 allowing for a 30 degree offset with a 30 degree listening edge on either side. FIG. 7 shows the waveguide 55 allowing for a 0 degree offset with a 60 degree listening edge on one side and a 55 degree listening edge on the other side. It is noted that the side wall is slightly asymmetrical from the other side wall. However, the asymmetrical is slight enough not to substantially effect the 0 degree offset in FIG. 10.

In one example operation, the speaker 10A receives an electrical signal via the terminals. The electrical signal is provided to the speaker crossover. The speaker crossover provides signals of varying frequency ranges, amplitudes, and/or phases to the drivers 30, 35, and 40. Filtering and conditioning of the electrical signals can occur as part of the crossover processes. The signals provided to the drivers 30, 35, and 40 are then projected from the DPC waveguide 50, and more broadly, the speaker 10.

Figure 13:
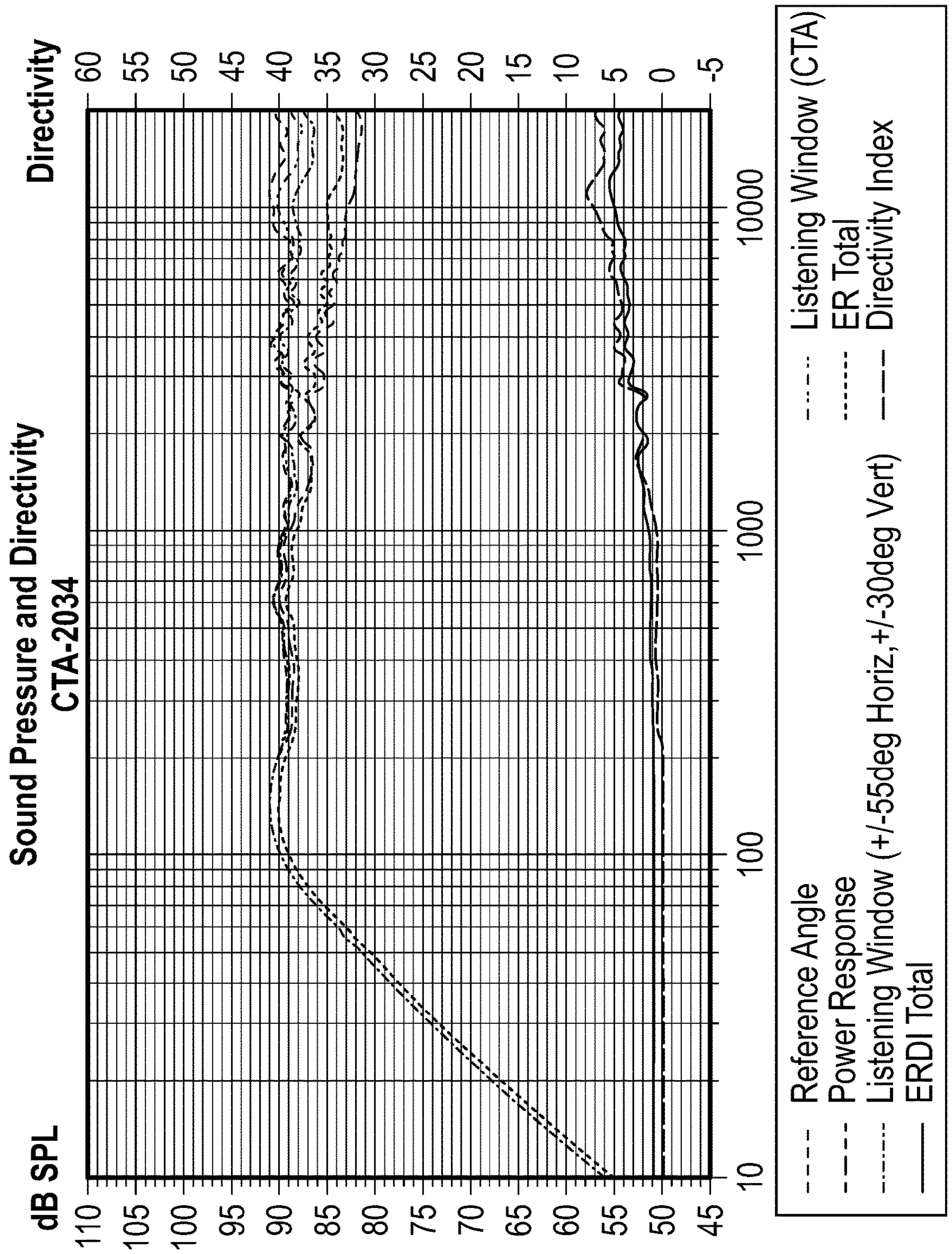
FIG. 13 is graph of sound pressure and directivity over frequency under the ANSI/CTA-2034 standard for the speaker of FIG. 1.

FIG. 13 is a graph of sound pressure level and sound directivity for the target axis of the speaker 10. The graph was obtained following the ANSI/CTA-2034 standard, which describes how to determine a frequency response, directivity, and maximum output capability of a residential loudspeaker—in this case the speaker 10 for FIG. 13. The left axis is sound pressure level in decibels, the right axis is directivity index in decibels, and the horizontal axis is frequency in hertz. The left axis is for the top five curves and the right axis is for the bottom two curves. The shown curves represent on-axis reference angle, sound power response, listening window (+/−55 degrees horizontal, +/−30 degrees vertical), early reflections directivity index (ERDI) total, listening window (CTA), early reflections (ER) total, and sound power directivity index for the speaker 10. The graph provides a near textbook response desired as recognized by those in the art.

Accordingly, the speaker disclosed herein provides a new and useful directivity pattern control (DPC) waveguide and a speaker including the DPC waveguide.

As used herein, the terms "a" and "an" are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC). The terms "approximately," "about," "substantially", and similar terms are intended to have a broad meaning in harmony with the common and accepted usage by those of ordinary skill in the art to which the subject matter of this disclosure pertains.

For the purpose of this disclosure, the term "coupled" means the joining of two members directly or indirectly to one another unless limited otherwise. Such joining may be stationary in nature or moveable in nature. Such joining may be achieved with the two members, or the two members and any additional intermediate members being integrally formed as a single unitary body with one another or with the two members or the two members and any additional intermediate members being attached to one another. Such joining may be permanent in nature or may be removable or releasable in nature.

The terms fixedly, non-fixedly, and removably, and variations thereof, may be used herein. The term fix, and variations thereof, refer to making firm, stable, or stationary. It should be understood, though, that fixed does not necessarily mean permanent—rather, only that a significant or abnormal amount of work needs to be used to make unfixed. The term removably, and variations thereof, refer to readily changing the location, position, station. Removably is meant to be the antonym of fixedly herein. Alternatively, the term non-fixedly can be used to be the antonym of fixedly.

It should be noted that references to relative positions (e.g., "top" and "bottom", "front" and "rear", "left" and "right", "up" and "down") in this description are merely used to identify various elements as are oriented in the Figures. It should be recognized that the orientation of particular components may vary greatly depending on the application in which they are used.

It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It is also important to note that the construction and arrangement of the system, methods, and devices as shown in the various examples of embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes and omissions may be made in the design, operating conditions and arrangement of the various examples of embodiments without departing from the spirit or scope of the present inventions.

While this invention has been described in conjunction with the examples of embodiments outlined above, various alternatives, modifications, variations, improvements and/or substantial equivalents, whether known or that are or may be presently foreseen, may become apparent to those having at least ordinary skill in the art. Accordingly, the examples of embodiments of the invention, as set forth above, are intended to be illustrative, not limiting. Various changes may be made without departing from the spirit or scope of the invention. Therefore, the invention is intended to embrace all known or earlier developed alternatives, modifications, variations, improvements and/or substantial equivalents.

The technical effects and technical problems in the specification are exemplary and are not limiting. It should be noted that the embodiments described in the specification may have other technical effects and can solve other technical problems.

Aspects herein can be embodied in other forms without departing from the spirit or essential attributes thereof. Accordingly, reference should be made to the following claims, rather than to the foregoing specification, as indicating the scope hereof.

What is claimed is:

1. A speaker defining a first axis, a second axis orthogonal to the first axis, and a third axis orthogonal to the second axis and orthogonal to the first axis, the speaker comprising:

a housing;

a discoid-shaped waveguide body coupled to the housing and comprising:

a mouth and a throat defined by the discoid-shaped waveguide body;

a body surface defining a horn coupling the mouth to the throat; and a driver aperture formed in and enclosed by the body surface, wherein the mouth is in a placement plane defined by the second axis and the third axis, and the first axis is orthogonal to the placement plane, a first driver fastened to the discoid-shaped waveguide body and to propagate sound toward the driver aperture along a propagation axis parallel to the first axis; and a second driver fastened to the discoid-shaped waveguide body and substantially adjacent to the throat, the second driver to propagate sound toward the throat along a major axis of propagation offset from the first axis, the major axis of propagation being in or substantially near a plane defined by the first axis and the third axis, wherein the propagated sound from the second driver toward the throat along the major axis of propagation offset from the first axis through the horn and exiting the mouth is a projected cone or lobe shape along the major axis of propagation; and a perforated driver cover fastened to the discoid-shaped waveguide body and to receive sound from the first driver, the perforated driver cover comprising:

a plurality of perforations defined in a pattern; and an exterior surface, wherein the body surface and the exterior surface are contiguous to further define the horn and being an acoustically continuous waveguide surface for the propagated sound from the second driver, and the propagated sound from the first driver toward the driver aperture along the propagation axis parallel to the first axis through the perforated driver cover is substantially omnidirectional along the propagation axis.

2. The speaker of claim 1, wherein the discoid-shaped waveguide body further comprises a second driver aperture formed and enclosed by in the body surface, and wherein the speaker further comprises:

a third driver fastened to the discoid-shaped waveguide body and to propagate sound towards the second driver aperture along a second propagation axis parallel to the first axis; and a second perforated driver cover fastened to the discoid-shaped waveguide body and to receive sound from the third driver, the second perforated driver cover comprising:

a second perforated pattern with a second plurality of perforations; and a second exterior surface, wherein the body surface and the second exterior surface are contiguous to further define the horn and furthering the acoustically continuous waveguide surface for the second driver, and the propagated sound toward the second driver aperture along the second propagation axis parallel to the first axis through the second perforated driver cover is substantially omnidirectional along the second propagation axis.

3. The speaker of claim 1, wherein the discoid-shaped waveguide body includes an aperture wall associated with the driver aperture, wherein the first driver is fastened to the aperture wall and propagates sound towards and through the driver aperture along the propagation axis.

4. The speaker of claim 3, wherein the plurality of perforations are aligned with the propagation axis.

5. The speaker of claim 4, wherein the perforations and the aperture wall define a filter for sound emanating from the first driver.

6. The speaker of claim 1, wherein the perforated driver cover has a thickness that is substantially continuous throughout the perforated driver cover.

7. The speaker of claim 1, wherein the perforated driver cover has a thickness that is variable throughout the perforated driver cover and has a surface substantially shaped to a surface of the first driver.

8. The speaker of claim 1, wherein the second driver is a wide-range tweeter to propagate sound at a range of frequencies between about 1 kHz and 20 kHz, and the first driver is a woofer to propagate a range of frequencies less than 1500 Hz.

9. The speaker of claim 8, further comprising a crossover circuit, the crossover circuit to provide a first electrical signal resulting in the range of frequencies between about 1 kHz and 20 kHz to the wide-range tweeter, and a second electrical signal resulting in the range of frequencies the range of frequencies less than 1500 Hz to the woofer.

10. The speaker of claim 2, wherein the second driver is a wide-range tweeter to propagate sound at a range of frequencies between about 1 kHz and 20 kHz, the first driver is a woofer to propagate a range of frequencies less than 1500 Hz, and the third driver is a mid-range tweeter to propagate sound at a range of frequencies between about 1 kHz and 5 kHz.

11. The speaker of claim 10, further comprising a crossover circuitry, the crossover circuitry to provide a first electrical signal resulting in the range of frequencies between about 1 kHz and 20 kHz to the wide-range tweeter, a second electrical signal resulting in the range of frequencies the range of frequencies less than 1500 Hz to the woofer, and a third electrical signal resulting in the range of frequencies between about 1 kHz and 5 kHz to the mid-range tweeter.

* * * * *